United States Patent
Singh et al.

(10) Patent No.: US 12,148,277 B2
(45) Date of Patent: Nov. 19, 2024

(54) ELECTRONIC MONITORING SYSTEM USING PUSH NOTIFICATIONS WITH CUSTOM AUDIO ALERTS

(71) Applicant: Arlo Technologies, Inc., Carlsbad, CA (US)

(72) Inventors: Rajinder Singh, San Jose, CA (US); Velabhai Bhedaru, San Jose, CA (US); Dennis Aldover, Carlsbad, CA (US); Nisheeth Gupta, San Jose, CA (US); Jason Goldsmith, San Jose, CA (US); Tom Doerr, El Granada, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 164 days.

(21) Appl. No.: 17/245,141

(22) Filed: Apr. 30, 2021

(65) Prior Publication Data
US 2022/0351593 A1 Nov. 3, 2022

(51) Int. Cl.
*G08B 13/19* (2006.01)
*G08B 13/196* (2006.01)

(52) U.S. Cl.
CPC . *G08B 13/19691* (2013.01); *G08B 13/19606* (2013.01); *G08B 13/19656* (2013.01); *G08B 13/19684* (2013.01)

(58) Field of Classification Search
USPC ......................................................... 348/143
See application file for complete search history.

(56) References Cited

U.S. PATENT DOCUMENTS

| | | | |
|---|---|---|---|
| 7,999,857 B2 | 8/2011 | Bunn et al. | |
| 8,682,034 B2 | 3/2014 | Garoutte | |
| 9,635,323 B2 | 4/2017 | Carter | |
| 9,706,178 B2 | 7/2017 | Carter | |
| 9,716,922 B1 | 7/2017 | Parker | |
| 9,743,049 B2 | 8/2017 | Scalisi et al. | |
| 9,882,736 B2 | 1/2018 | Lett | |
| 10,091,017 B2 | 10/2018 | Landow et al. | |
| 10,621,839 B2 * | 4/2020 | Vazirani | G08B 7/066 |
| 10,635,907 B2 | 4/2020 | Child et al. | |
| 2003/0025599 A1 | 2/2003 | Monroe | |

(Continued)

OTHER PUBLICATIONS https://medium.com/@dmennis/the-3-ps-to-custom-alert-sounds-in-ios-push-notifications-9ea2a2956c11, dated Jan. 16, 2018 and downloaded Apr. 29, 2021.
https://community.smartthings.com/t/smartthings-event-specific-text-to-speech-tts-for-your-android-phone-with-tasker/75443.

*Primary Examiner* — Mikhail Itskovich
(74) *Attorney, Agent, or Firm* — Boyle Fredrickson S.C.

(57) ABSTRACT

An electronic monitoring system has one or more imaging devices that can detect a triggering event based on motion and/or sound and that concurrently provide a push notification to a user device with a custom audio alert indicative of the one or more triggering events for quickly identifying the triggering without requiring the remote device to execute a dedicated application program. The custom audio alert portion of the push notification may provide various details of the triggering event, categorized as either a genus level triggering event and/or a species level triggering event, i.e., a subset of the genus level triggering event. The push notification can operate as a custom audio alert and a pop-up message which can be pushed to the device and broadcast or displayed via an operating system of the device.

20 Claims, 6 Drawing Sheets

(56) References Cited

U.S. PATENT DOCUMENTS

| | | |
|---|---|---|
| 2015/0235540 A1 | 8/2015 | Verna et al. |
| 2016/0240007 A1 | 8/2016 | Weerasinghe |
| 2017/0171516 A1 | 6/2017 | Modestine et al. |
| 2017/0180499 A1* | 6/2017 | Gelfenbeyn ............ H04L 67/55 |
| 2017/0195386 A1 | 7/2017 | Nathan et al. |
| 2018/0374325 A1 | 12/2018 | Gilmartin et al. |
| 2019/0289263 A1 | 9/2019 | Amini et al. |
| 2020/0013266 A1 | 1/2020 | Lemberger et al. |

* cited by examiner

ELECTRONIC MONITORING SYSTEM USING PUSH NOTIFICATIONS WITH CUSTOM AUDIO ALERTS

BACKGROUND OF THE INVENTION

1. Field of the Invention

The present invention relates to an electronic monitoring system, and more particularly, to an electronic monitoring system in which detection of a triggering event causes a notification to be sent to a user device which can play an audio alert to signify the receipt of the notification that is customized to one or more aspects of the triggering event.

2. Discussion of the Related Art

Cameras have long been used as part of monitoring and/or surveillance systems. More recently, cameras have been coupled with electronic sensors to detect triggering events, such as a detected motion, to allow recording of an area once a triggering event has occurred. Video cameras have also been connected to computers with network access to allow a user to remotely monitor an area with a user device such as a laptop or desktop computer, a smart phone or tablet computer. In such systems, automatic notifications, broadly referred to herein as push notifications ("PNs") can be sent to alert a user of a user device of an event of interest occurring within the field of view of the camera and/or electronic sensor. Upon receiving the push notification, the user can tap the push notification to open a dedicated application program for interacting with video cameras and/or other aspects of the monitoring system.

However, in such systems, opening a dedicated application program of the user device to obtain more information about what may have occurred can be undesirable. For some devices, this requirement could result in excess delay, inefficiency and/or a potential crash during a time in which immediate access to the system is highly important. Users may also be disinclined to bother to check their device if they have to open an application simply to determine whether a triggering event is really of interest. What is needed is an improved system that eliminates one or more of the foregoing disadvantages and provides a push notification that is customized to one or more aspects of the triggering event.

SUMMARY OF THE INVENTION

An electronic monitoring system having one or more imaging devices can be configured to detect a triggering event based on motion and/or sound and concurrently provide a push notification to a user device for quickly indicating and/or monitoring the event via the push notification without requiring the user to execute a dedicated application program on the user device. The push notification can operate as a custom audio alert indicative of the triggering event and/or pop-up message which can be pushed to the user device and displayed via an operating system of the device. The custom audio alert portion of the push notification may provide various details of the triggering event, categorized as either a genus level triggering event and/or a species level triggering event. The terms "genus" and "species" as used herein simply refer to a set and a subset of that subset respectively. There can be various levels of genus and species. For example, a person can be considered a genus and a delivery person could be species within that genus. Drilling down a level further, a mail carrier could be a species of the genus delivery person. Drilling down still a level further, Jill could be s a species of the genus mail carrier. The levels between the uppermost level levels and the bottom-most level also could be considered "subgenuses." For the sake of simplicity, unless otherwise noted in a particular example, the term "genus" will encompass both genuses and sub-geneses. By providing event details in the push notification, such as an audio indication of the triggering event, the monitoring system can be greatly improved.

Accordingly, in one aspect, the invention can provide an improved user experience for an electronic monitoring or surveillance system and/or process in which push notifications ("PN's") on an application based "computer device", such as a Personal Data Assistant ("PDA"), a smart phone, a tablet, a laptop computer, or a desktop computer, can be operable to advise a user of surveillance system camera activation, identify a cause or causes of the event, whether audio or motion, and even in some applications of the invention to permit a user to identify the surveillance system camera activation triggering event without having to take any action other than listening to the broadcast custom audio alert provided with the PN. The system may, if desired, be used in a network-based security/surveillance system that detects a triggering event, such as a motion and/or audio detection, to initiate recording. The system can be implemented over a Local Area Network (LAN) and/or a Wide Area Network (WAN).

Specifically then, one aspect of the present invention provides an electronic monitoring system including: an imaging device configured to detect an at least one triggering event comprising at least one of a motion and a sound and to capture data corresponding to the triggering event. A system controller in communication with the imaging device can execute a program that is stored in a non-transient medium and that is operable to categorize at least one of the triggering events as a species level triggering event and send a push notification to a user device upon the imaging device detecting the at least one categorized triggering event. The push notification can be configured to access an audio file from a user device database corresponding to the categorized triggering event and to generate an audio alert at the user device from the audio file to provide an audio identification of the categorized triggering event and an imaging device identification upon receipt of the push notification at the user device.

An area corresponding to a triggering event can be any physical area in which a triggering event occurs and in which an imaging device is configured to record upon the triggering event occurring. For example, a field of view of a camera could be an area corresponding to a triggering event, whether the triggering event is detected by a motion sensor, an RF sensor, or something else entirely. Similarly, a distance within an audible range of a microphone could also be an area corresponding to a triggering event.

A species level triggering event can, for example, be detection of a specified person, detection of a specified vehicle, detection of a specified animal, detection of a package, detection of a specified sound, or detection of motion within a specified area within a field of view of the imaging device.

In another aspect of the present invention, the system can further categorize another triggering event as a genus level triggering event, which can for example be, detection of an unspecified person, detection of an unspecified vehicle, detection of an unspecified animal, detection of unspecified motion, detection of an unspecified sound, or detection of motion within an unspecified area within the field of view of the imaging device.

Another aspect of the present invention provides a method for electronic monitoring including a first step of assigning a text identifier to a species level categorized triggering event comprising at least one of motion and sound and then storing an audio file associated with the categorized triggering event to the user device database. At the imaging device detecting a triggering event comprising at least one of a motion and a sound and using an imaging device for recording an area corresponding to the triggering event. Then, categorizing the triggering event as the species level categorized triggering event and sending a push notification to the user device indicating the species level categorized triggering event. The user device can then generate an audio alert device from the audio file to provide an audio identification of the species level categorized triggering event and an imaging device identification upon receipt of the push notification at the user device.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
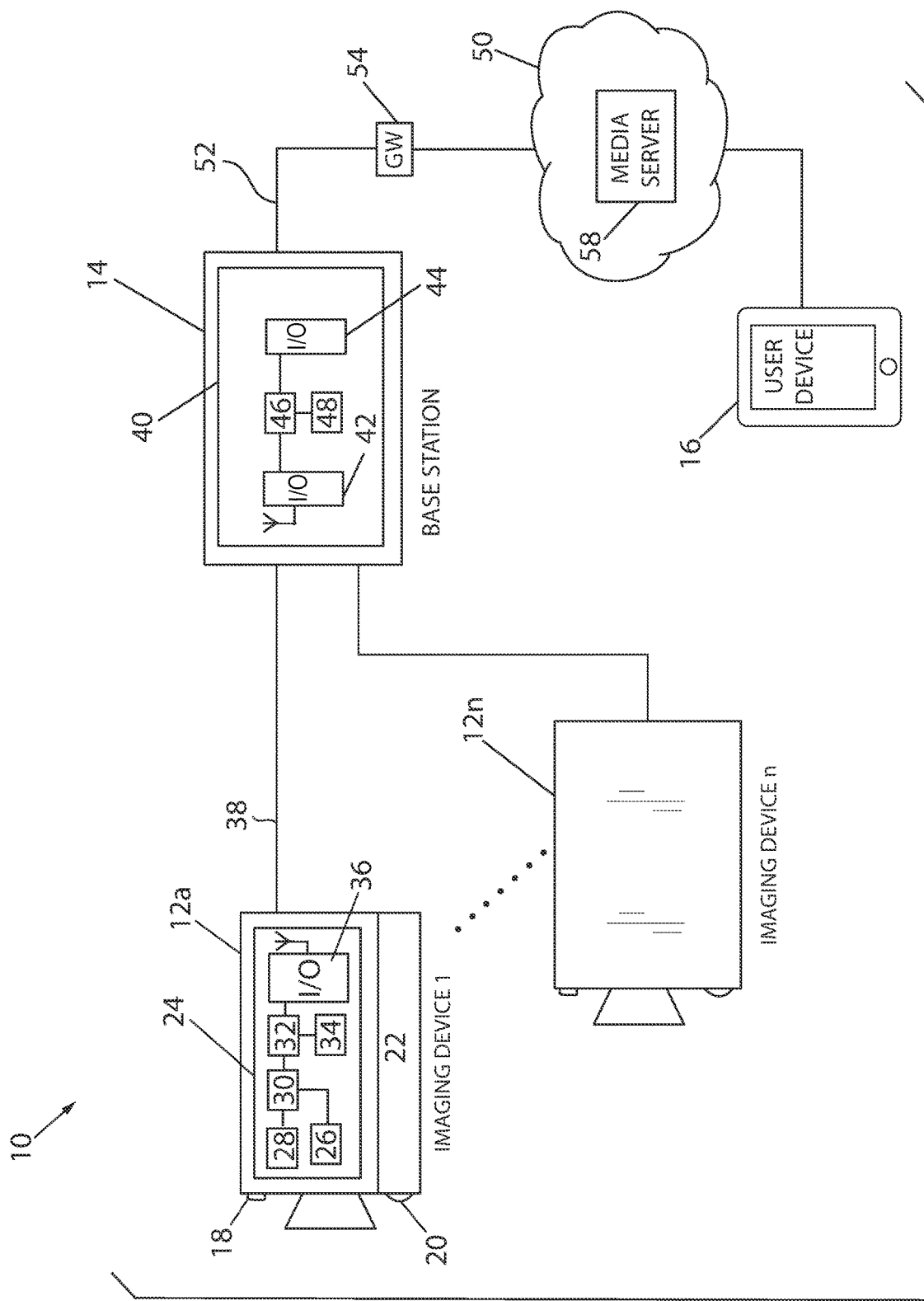
FIG. 1 is a block diagram of a system for electronic monitoring in which detection of a triggering event by an imaging device can cause a custom audio alert push notification to be sent to a user device in accordance with an aspect of the invention.

Referring now to FIG. 1, in accordance with an aspect of the invention, an electronic system 10 for real-time monitoring can include one or more imaging devices 12 and a hub or base station 14. A number "n" 12a-12n images devices are schematically illustrated in FIG. 1. One or more user devices 16 such as a smart phone, tablet, laptop, or PC communicating with the base station 14. Each user device includes a display that typically includes both an audio display and a video display, internal computing and storage capabilities, and a program or application servicing as a user interface with the remainder of the system 10.

Each imaging device 12 is configured to acquire data and to transmit it to the base station 14 for further processing and/or transmission to a server and/or the user device(s) 16. Each imaging devices 12 may be battery powered or wired. The acquired data typically will correspond to a video image, and each imaging device 14 may be or include a camera such as a video camera 24. Several such imaging devices may be mounted around a building or other structure or area being monitored. For example, in the case of a residential home, imaging devices 12 could be mounted by each entrance and selected windows. An imaging device 12 also could be incorporated into or coupled to a doorbell, floodlight, etc. Still referring to FIG. 1, one or more of the imaging devices 12 may also include a microphone 18, visible and/or infrared (IR) lights 20, a power supply 22, and/or imaging device electronic circuitry 24. Circuit 24 may include an imager 26, an audio circuit 28, a media encoder 30, a processor 32, a non-transient memory storage 34 and/or a wireless I/O communication device 36, among other things. Each imaging device 12 can be in communication with the base station 14 through a network such as a private Wireless Local Area Network (WLAN) 38, hosted by the base station 14 operating as an access point. One such network is an IEEE 802.11 network.

Still referring to FIG. 1, the hub or base station 14 can include base station electronic circuitry 40, including a first wireless I/O communication device 42 for communicating with the imaging devices 12 over the WLAN 38, a second wired or wireless I/O communication device 44 for accessing the Wide Area Network (WAN) 50, such as the Internet through a Local Area Network (LAN) 52 connected to a Gateway and/or Router 54, a processor 46 and/or a non-transient memory storage 48, among other things. It should be apparent that "circuitry" in the regard can comprise hardware, firmware, software, or any combination thereof. In one aspect, the imaging devices 12 could be Arlo® cameras, and the base station 14 could be an Arlo® base station, each available on a stand-alone basis or as part of any of a number of systems available from Arlo Technologies, Inc. of Carlsbad, California.

The base station 14 may also be in communication with a sever 58, which may be a cloud-server accessible via the WAN 50. The server 58 can include or be coupled to a microprocessor, a microcontroller or other programmable logic element configured to execute a program. This program, while operating at the server level, may be utilized in filtering, processing, categorizing, storing, recalling and transmitting data received from the imaging device 12 via the base station 14.

In operation, each imaging device 12 can be configured, though suitable mounting of the imaging device 12 and/or through suitable manipulation of its controls, to monitor an area of interest, such as a part of a building or section of property. An imaging device 12 may be commanded to capture image either automatically upon detection of a triggering event or through the transmission of a command from a user device 16. An image also may be captured automatically upon detection of a triggering event detected by a detector. The triggering event may be motion, and the detector may be a motion detector. Instead of or in addition to detecting motion, the detector could include an IR sensor detecting heat, such as the body heat of an animal or person. The triggering event also could be sound, in which case the detector may include the microphone 18. In this case, the triggering event may be a sound exceeding a designated decibel level or some other identifiable threshold. Upon receiving notification from an imaging device 12 of a triggering event, the system 10 can generate alerts such as push notifications ("PN"), to send an alert or PN to one or more user devices 16 for indicating the triggering event.

Whether camera operation is triggered by a command from a user device 16 or by detection of a triggering event, the camera 24 can then capture a raw video stream which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Under control of the processor 32 executing the program, the encoded media stream can be transmitted from the wireless I/O communication device 36 to the base station 14.

Figure 4:
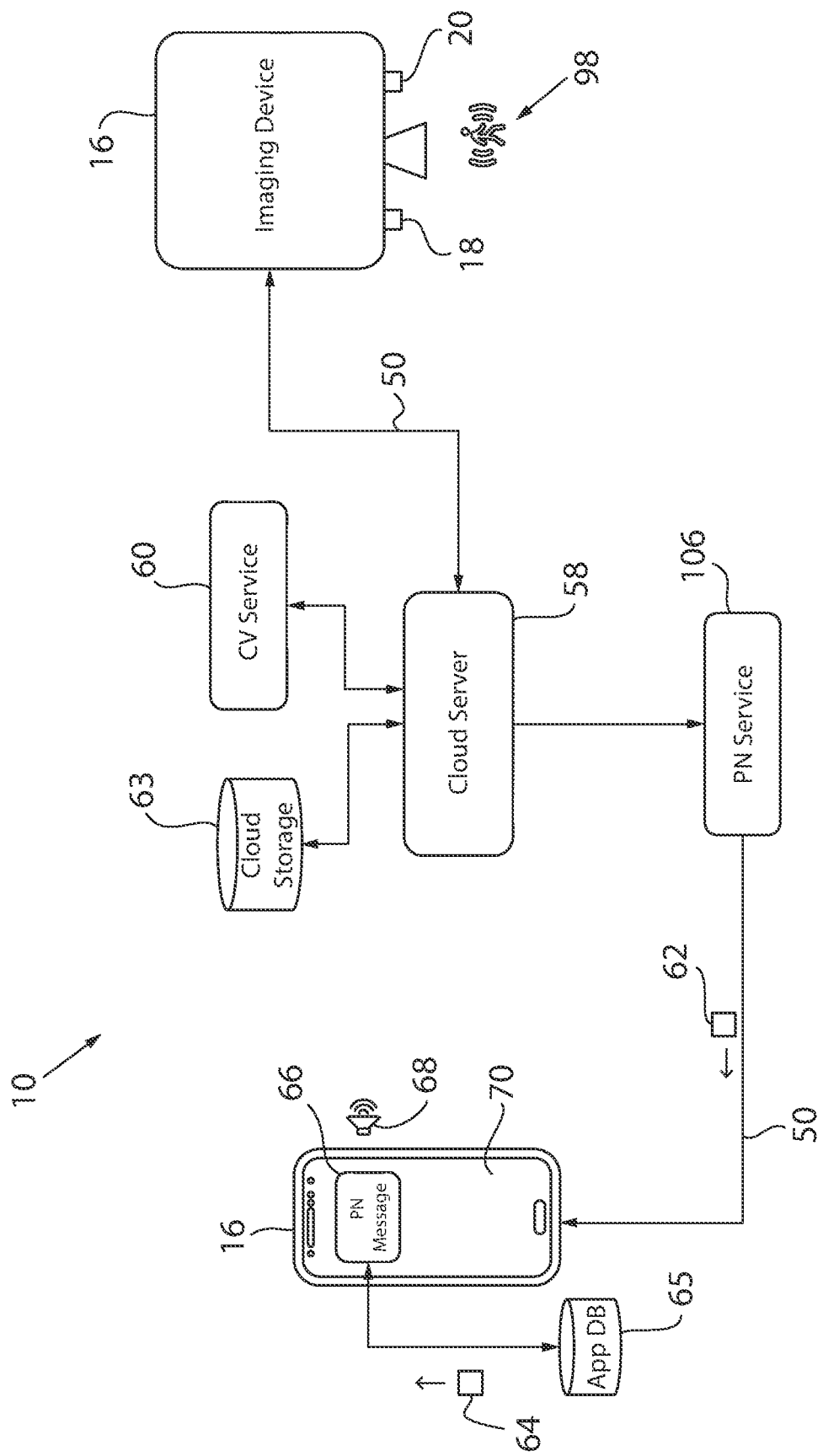
FIG. 4 is a block diagram of a system for playing a custom audio alert at a user device in response to receiving a corresponding push notification in response to detection of a single species level categorized triggering event in accordance with an aspect of the invention.
Figure 5:
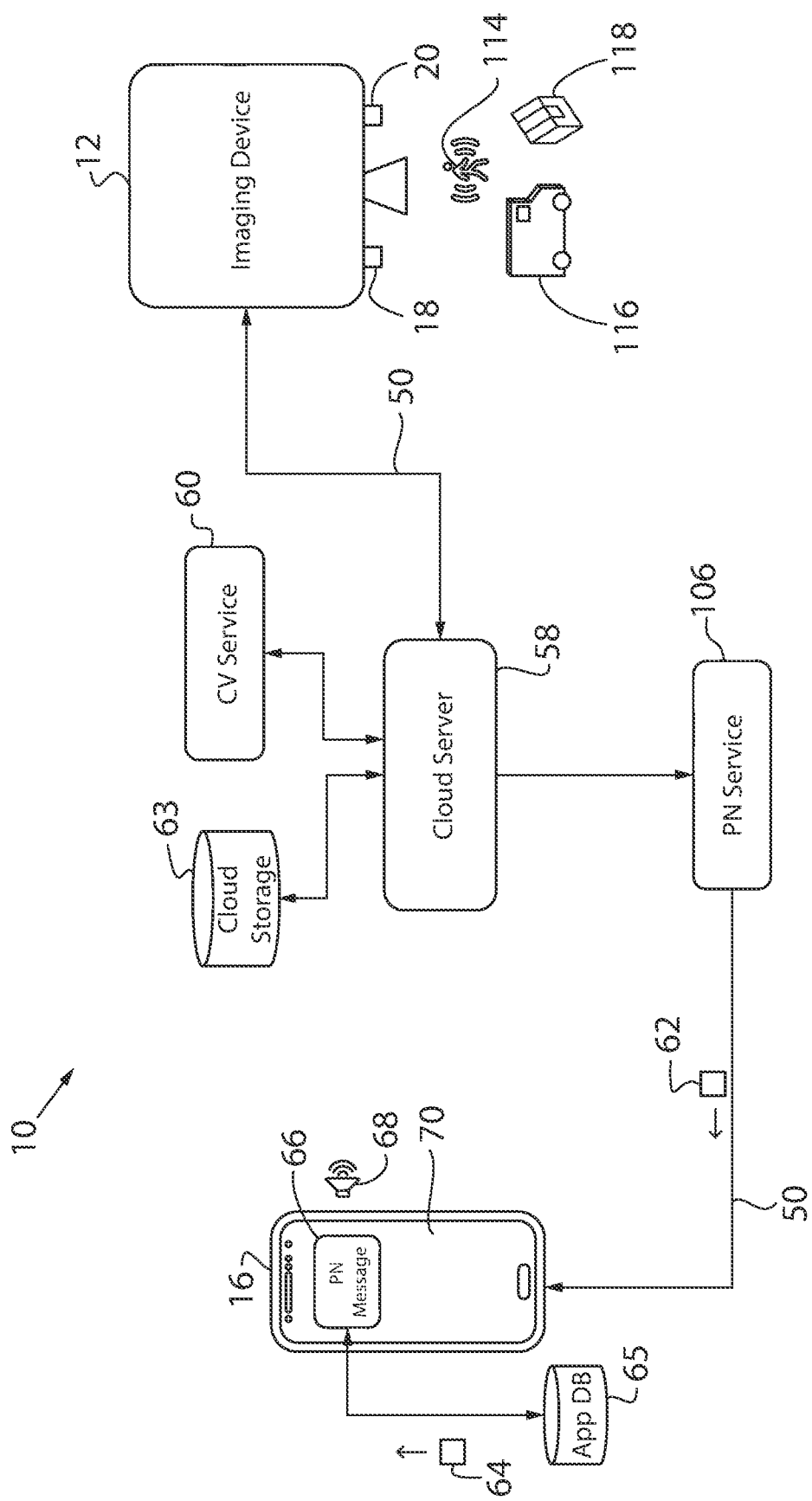
FIG. 5 is a block diagram of a system for playing a custom audio alert at a user device in response to receiving a corresponding push notification in response to detection of a more than one species and/or genus level categorized triggering event in accordance with an aspect of the invention; and, FIG. 6 is a flow chart for generating the playing custom audio file according to the system of FIG. 4.

The media stream may then be transmitted via the WAN 50 to a remote data storage device 63 in communication with a media server 58, for data storage in the form of a recording and processing. Referring briefly to FIGS. 4 and 5, the storage device 63 may be a cloud-based storage device, and the media sever 58 may be a cloud server accessible via a wireless connection 50. The server 58 can include or be coupled to a microprocessor, a microcontroller or other programmable logic element (individually and collectively considered "a controller") configured to execute a program. The controller may be contained in whole in the base station 14 or the server 58. Alternatively, interconnected aspects of the controller and the programs executed by it could be distributed in various permutations within the imaging device 12, the base station 14, the user device 16, and the server 58. This program may be utilized in filtering, processing, categorizing, storing, recalling and transmitting data received from the imaging device 12 via the base station 14. Server 58 may also communicate with or include a computer vision program 60 ("CV"), which can apply one or more filters or processes, such as edge detection, facial recognition, motion detection, etc., to detected one or more characteristics of the recording such as, but not limited to, identifying an individual, animal, vehicle, or package present in the media stream.

Figure 2:
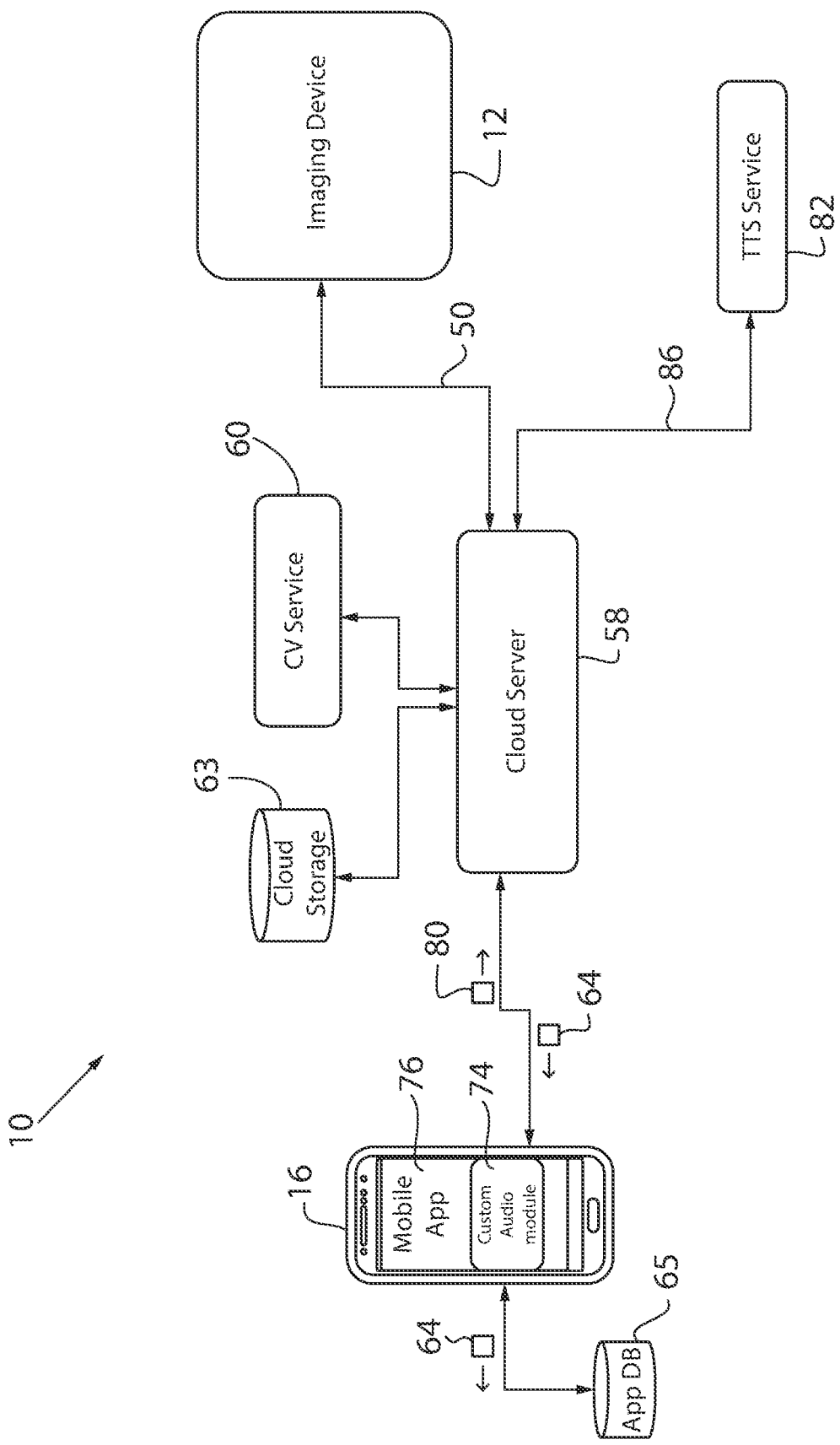
FIG. 2 is a block diagram of a system for generating a custom audio file to be broadcast by a user device in the electronic monitoring of FIG. 1, in response to a corresponding push notification being sent to a user device in accordance with an aspect of the invention.

Referring to the block diagram of FIG. 2, upon receiving notification from an imaging device 12 of a triggering event, e.g., visual movement or sound, and/or identification of the triggering event classification, e.g., person, animal, vehicle, or package present in the recording, provided by the CV 60, the server 58 may generate an alert such as a push notification 62 ("PN") to one or more user devices 16 for indicating the triggering event. A filtered or otherwise processed image 66 can then be displayed on the user device 16, along with additional visual and/or audio messaging such as a text and/or custom audio file 64 that is played or broadcast as custom audio alert 68 from a speaker of the electronic device 16 to indicate receipt of the PN 62 at the user device 16 and simultaneously identify a generic or particular person or object as the triggering event.

The PN 62 or other alert signal received by the user device 16 can be configured to display an alert via the user device 16. For example, a PN 62 can operate as a pop-up message pushed to the user device 16 that can be displayed via an operating system of the user device 16 to the touchscreen I/O 70 of the user device 16. This can allow a user to quickly view and/or monitor the triggering event via the PN 62 without requiring the user device 16 to execute a dedicated application program. Accordingly, the PN 62 can be operable to indicate a detection of a motion or sound to the user and provide an image of the recording from the imaging device 12. Moreover, the alert signal can display the alert image 66 and play or broadcast a custom audio alert 68 on the user device 16 while the imaging device 12 is still recording the area corresponding to the triggering event. The PN 62 or other alert signal can also cause the user device 16 to transmit another audio and/or visual signal to indicate receipt of the alert signal at the user device 16. For example, while the user device 16 according to one aspect of the present invention may be configured to play a customized audio sound upon receipt of a PN 62 to bring the user's attention to the alert, as will be described in further detail below, the PN 62 may also provide audio transmitted from the microphone 18 of the imaging device 12.

The PN 62 can include preconfigured routing information, and a unique identification number ("UID"), for routing the PN 62 to the user device 16, and for distinguishing one PN 62 from another, respectively. It should be appreciated that a single PN 62 having a UID can be sent based on an imaging device 12 detecting a single triggering event. However, multiple PN's having differing UID's can also be sent based on multiple triggering events, such as an imaging device 12 detecting multiple triggering events, or multiple imaging devices 12 detecting a single or multiple triggering events.

Still referring to FIG. 2, and now referring to 3, which is a corresponding flow chart for one embodiment of a subsystem of the system 10 that is to configure to generate a custom audio alert 68 in response to receiving a corresponding PN 62 is shown. Initially at step 72, a user of system 10 will access a custom audio module 74 within the mobile app 76 that is operating on the user device 16, which is configured to control the system 10 and those imaging devices 12 contained thereon. Selection of the custom audio alert 68 that is to be played from the user device 16 in response to a triggering event sensed at the imaging device 12 is customized according to the nature or classification of the triggering event. For example, the imaging device 12 may sense a triggering event that is categorized at the genus level. Such genus level categorized triggering event may include: motion detection of a generic or unspecified object. The object may be, for example, a person, a vehicle, an animal, or a sound. Furthermore, such triggering event may be detected and categorized directly by the imaging device without the need for server level integrated computer vision processing via CV service 60. However, it is also considered within the scope of the present invention that some genus level categorized triggering events, such as but not limited to human person detection, vehicle detection and animal detection may require computer vision processing either at a via CV service 60 located at the server 58 or base station 14.

In addition to genus level categorized triggering events, selection of the custom audio alert 68 that is to be played from the user device 16 in response to a triggering event sensed at the imaging device 12 may be further customized according to one or more triggering events that is categorized at a species level, which is to say a unique triggering event relative to a common genus category. Objects capable of causing such species level categorized triggering events may include: a specific individual person detected by, for example, facial recognition, retinal identification, voice identification, walking gate identification, etc.; a specific vehicle detected by identification of, for example, via license plate number, vehicle profile, vehicle marking/signage identification etc., a specific animal such as family pet whose detected, for example, by comparison of the image to a stored image of the pet; package drop-off and pick-up detection that can be detected by recognition of common package shape and size, and activity zone detection within a subset of a field of view of an imaging device 12. It should again be understood that the listing of triggering events and the associated objects categorized at the species level, provided above, are representative examples offered by way of non-limiting example. Furthermore, while such triggering event identification and categorization may be detected via computer vision processing, it should be understood that such CV based identification may occur either at a CV service 60 in communication with the server 58, or alternatively within the hub or base station 14 prior to transmitting the media packets to the server 58.

As mentioned above, it is also possible to have intermediate levels of detection. Hence, in addition to detecting an unspecified person and, a person as being a member of a specified class or subset, and an individual within that subset. As another example, it is possible to detect a generic animal, a specific type of animal such as a cat, and a specific cat such as "GINGER" the family pet.

Figure 3:
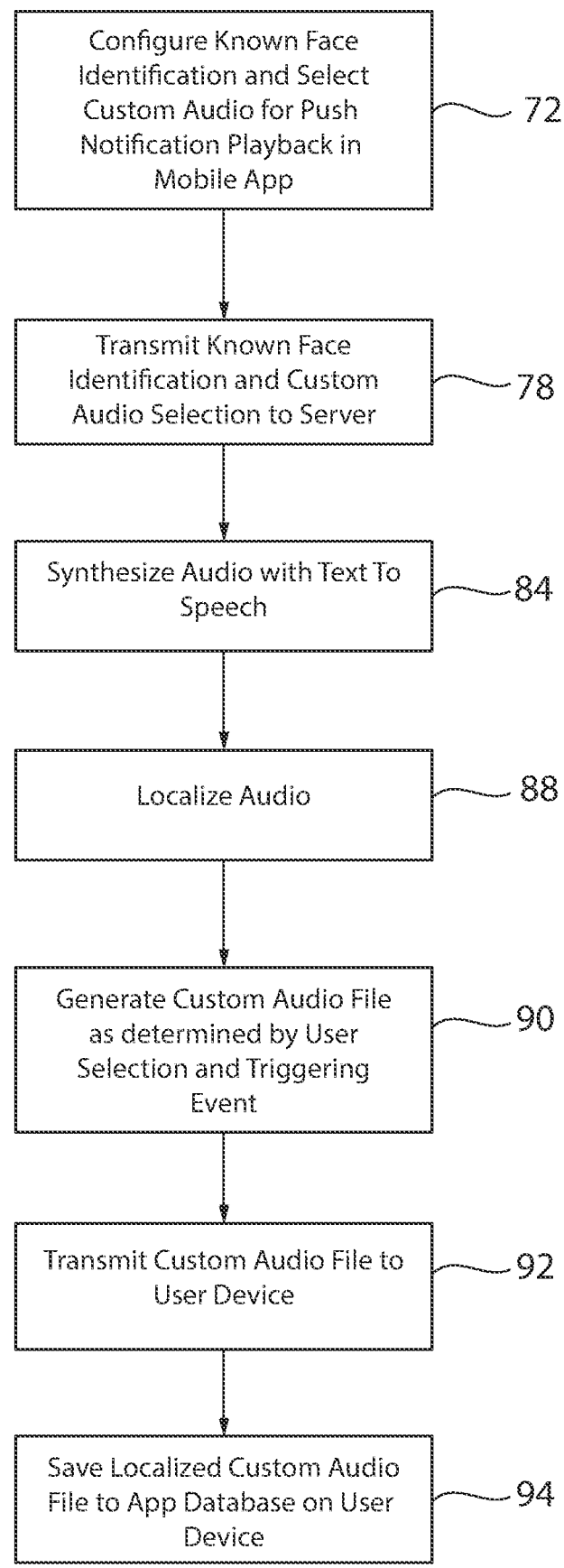
FIG. 3 is a flow chart for generating the custom audio file according to the system of FIG. 2.

Still referring to FIG. 3, by way of nonlimiting example, at initial step 72, using the custom audio module 74, the user may choose to create custom audio alerts 68 to be played from the user device 16 in response to the imaging device 12 when the triggering event is a combination of identifying a particular person via facial recognition (a species level category) and identification of the imaging device, e.g., camera). Identifying the particular person via facial recognition may include the entry of an individual's name via text input at the custom audio module 74, for example "JOHN DOE", and forming a correlation between that identified name and an uploaded image or video recording of the individual's face. Similarly, identifying the imaging device, e.g., camera, may include the entry of text input at the custom audio module 74, for example "PATIO DOOR", to identify the location of the camera. In one embodiment of the present invention, the addition of one or more imaging devices 12 to an existing system 10 may include a request that newly added devices 12 be provided with a name via text input. Such updates to the system may result in updating the preexisting custom audio alerts 68 to also include those alerts occurring in the field of view of the newly added imaging device 12.

At subsequent step 78, the custom audio request 80, which includes the selections input by the user at step 72, are transmitted to the server 58. The request 80 may also include additional user input data such as the uploaded image or video recording of the individual's face, and a preferred local language and/or dialect in which the custom audio alert 68 is to be played from the user device 16.

The text and local language and/or dialect requests are then provided to a text-to-speech service 82, at step 84 where the corresponding speech is synthesized. The text-to-speech service 82 may be integrated into the functionality of the server 58 or may be provided by way of a discrete cloud-based service, accessible via an API 86. Additionally, at subsequent step 88 the text-to-speech service 82 may localize or translate the synthesized audio into the desired language and/or dialect as was indicated in the custom audio request 80 generated by the user.

From the synthesized and localized audio output, a custom audio file 64, such as but not limited to an .mp3 format file, is generated at the server 58 at step 90. Upon generation, the custom audio file 64 is assigned a file name that uniquely identifies the file 64 based upon the request of the user. By way of the present example, the custom audio file 64 may be <PATIO DOOR_JOHN_DOE_DETECTED.mp3>, or the like. Once generated and named, the custom audio file 64 is transmitted back to the user device 16 at step 92, where it is then saved to the app database 65 in step 94. Once configuration has been completed, the custom audio file 64 will be available for playback as custom audio alert 68, upon receipt of a PN 62 that specifies playback of the <PATIO DOOR_JOHN DOE_DETECTED.mp3> audio file 64, given that the corresponding triggering events have been identified, i.e., the individual's identify has been verified, such as identification of the person's face via facial recognition, in an image captured at the appropriate imaging device 12.

While FIG. 3 provides a flow chart for one embodiment of configuring, the system 10 to play a custom audio alert 68 in response to receiving a corresponding PN 62, it should be understood that alternative configurations are well within the scope of the present invention. For example, in one embodiment, one or more of the genus and species level triggering events may provide corresponding prerecorded audio segments that are stored at the remote data storage device 63 in communication with a media server 58. Accordingly, upon receipt of the custom audio request 80 at the service in step 78, the server may proceed directly to step 90, where the audio file 64 is generated by stitching together prerecorded audio segments, rather than synthesizing and/or localizing individual requests.

In yet another embodiment of configuring the system 10 to play a custom audio alert 68 in response to receiving a corresponding PN 62, the custom audio module 74 in the application 76 running on the user device 16 may directly record or upload an audio file 64 in the initial step of selecting the custom audio for push notification playback. For example, a user may directly record the audio file 64 that they wish to play back as the custom audio alert 68 for a given combination of trigger events. This user generated audio file 64 may then be saved to the app database 65 on the user device 16, as in step 90; while, the corresponding file name and trigger events are provided to the server 58 in order for future PNs 62 to specify playback of the given audio file 64 by name, once the corresponding triggering events have been identified.

While the nonlimiting example of PN related custom audio alert 68 configuration described above includes facial recognition and imaging device identification, it should be understood that alternative embodiments of configuring PN related custom audio alert 68 are well within the scope of the present invention. For example, custom audio alert 68 for a PN 62 in accordance with an embodiment of the present invention may be formed for any combination of an imaging device identifier with one or more species level categorized triggering events (specific individual person detection, specific vehicle detection, specific animal detection, package drop-off and pick-up detection, and activity zone detection within a subset of a field of view of an imaging device 12). Additionally, custom audio alert 68 for a PN 62 in accordance with an embodiment of the present invention may be also formed for any combination of an imaging device identifier, such as a camera location or number, with one or more species level categorized triggering events and one or more genus level categorized trigger events (motion detection, human person detection, vehicle detection, animal detection, and sound detection).

Figure 6:
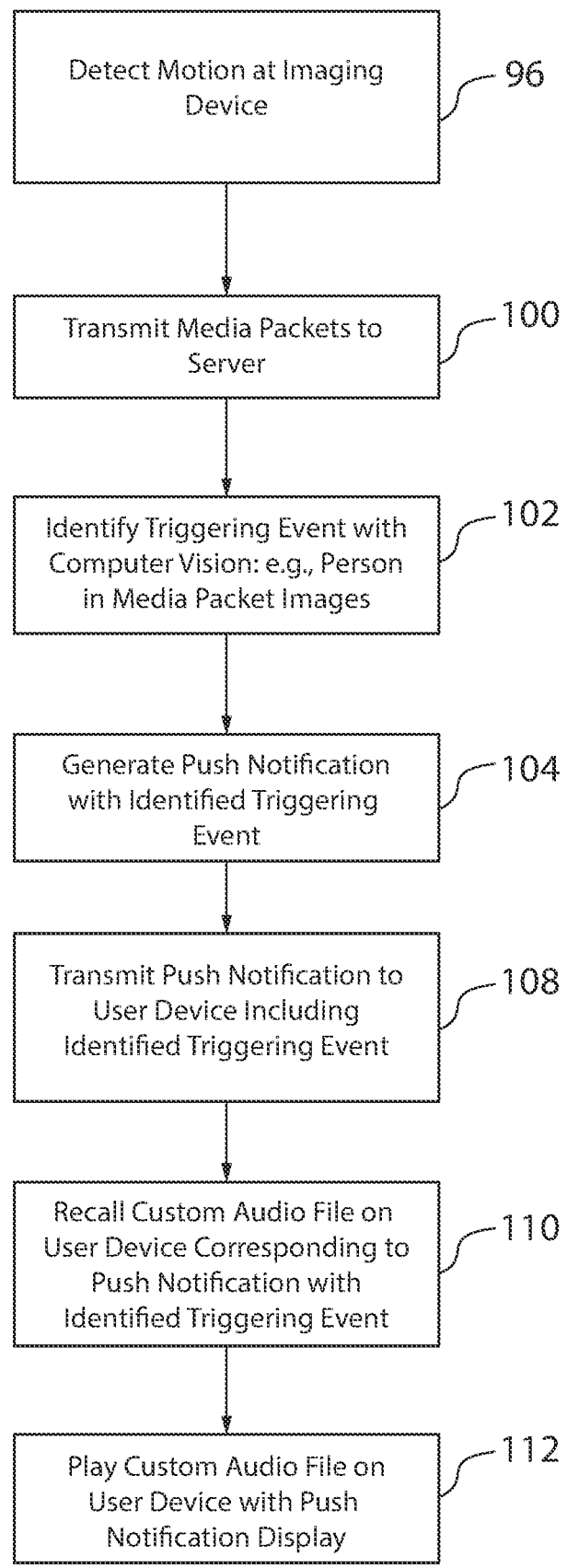

Turning now to FIGS. 4-6, the playback of custom audio alert 68, as a subsystem of the general system 10, will now be described in further detail. Referring initially to FIGS. 4 and 6, a schematic view and a corresponding flow chart for one embodiment of playback of custom audio alert 68 within the system 10 in response to receiving a corresponding PN 62 is shown. Following the initialization of the system 10, its imaging device 12, and the configuration of custom audio files 64, the imaging device can begin monitoring areas for triggering events at step 96. The imaging devices 12 can monitor for both genus and species level categorized triggering events, such as motion or sound produced by an object 98, for example, using camera of the imaging device 12, microphones 18 and/or motion sensors 20, in various configurations, including as described above with respect to FIG. 1. The monitoring without additional action can continue in a continuous loop so long as no triggering events are detected. However, if an imaging device 12 detects a triggering event, for example motion of a person 98 at step 96, the imaging device 12 can begin capturing and recording data from the area corresponding to the triggering event at step 100, where the image and sound collected by the imaging device are transmitted as media packets over the WAN 50 to the server 58 from the imaging device 12 and/or base station 14.

Next, at step 102, the system 10 may process the media packets to identify and classify the triggering event contained therein. As described above, the media packets may be processed by the CV 60 that is in communication with the server 58 through network 50, such as a cloud-based server 58 and corresponding cloud-based CV 60 service. Alternatively, the processing of the media packets to identify and classify the triggering event may occur directly in the base station 14, prior to the media packets being received at the server 58. In either embodiment, the imaging device 12, which detected the triggering event, can then determine whether a triggering event is still being detected. In one aspect, this can be accomplished by continuously monitoring for triggering events over a particular interval and concluding that a triggering event is no longer being detected if a triggering event does not occur within the interval. In another aspect, this can be accomplished by monitoring for a second triggering event after a predetermined time period and concluding that a triggering event is no longer being detected after expiration of that time period. If a triggering event is still being detected, the imaging device 12 can be instructed to continue capturing, recording, and transmitting at step 100, so long as a triggering event is still being detected at step 102. In addition to determining the duration of the triggering event, the processing of the media packets at step 102 further comprises the identification, i.e., classification of the triggering event. For example, at step 102, the CV 60 may identify the presence of one or more genus level triggering events (motion detection, human person detection, vehicle detection, animal detection, and sound detection) and/or one or more species level triggering events (specific individual person detection, specific vehicle detection, specific animal detection, package drop-off and pick-up detection, and activity zone detection within a subset of a field of view of an imaging device 12. By way of continuing the non-limiting example provided above in the discussion of FIGS. 2 and 3, the system 10 at step 102 may identify the motion of a person 98 as a genus level triggering event. More specifically, the system 10 at step 102 may identify the person 98 via facial recognition, i.e., a species level triggering event, as the particular person correlating to the name "JOHN DOE" as was previously entered by the user during the initial configuration step 72, from FIG. 2. As mentioned above, intermediate levels of triggering events also could be detected such as motion of a "delivery person" or even "mail carrier."

Having now identified and classified the triggering event with the CV 60, at subsequent step 104 the system 10 may proceed to generating a PN 62. The PN 62 may be generated by a PN service 104 that is in communication with the server 58 through network 50, such as a cloud-based server 58 and corresponding cloud-based PN service 106. Alternatively, the generation of the PN 62 may occur directly in the server 58. In generating the PN 62, the system 10 combines the classified one or more triggering events, e.g., the identification of the individual whose face that has been verified via facial recognition and the identification of the appropriate imaging device 12, and identifies the proper corresponding audio file 64 to be played at the user device 16 as a custom audio alert 68 indicating receipt of the PN 62 at the user device 16, i.e., the <PATIO DOOR_JOHN DOE_DETECTED.mp3> audio file 64 in the context of the prior nonlimiting example. As such, the PN 62 generated at step 104 includes the instruction to play the corresponding audio file 64, an image transmission or recording including the individual 98 received from the imaging device 16 provided via the media packets, and an audio transmission or recording of the individual 98 received from the microphone 18 of the imaging device via the media packets.

At step 108, the PN 62 is transmitted via WAN 50 or cellular network from the PN service 106 or corresponding functionality of the server 58, to the user device 16. While FIGS. 4 and 6 illustrate a single recipient user device 16 receiving the PN 62, it should be understood that the present invention is not so limited and that multiple users and or multiple user devices 16 may be present in the system 10 to receive the PN 62. Furthermore, it should be understood that the multiple PNs 62 may include instructions to play a distinct custom audio file 64 at one or more user devices 16 in response to the same single or combination of triggering events. For example, two users of the same system 10 may request different localized audio, e.g., language, dialect, accent, gender, etc., for their custom audio alert 68 played at their corresponding user device 16 in response to the same triggering event. Accordingly, the system 10 may generate multiple distinct PNs 62 in response to the same single or combination of triggering events and transmit the unlike PNs to individual user devices or groups of user devices.

At subsequent step 110, when the PN 62 is received at the user device 16, the instruction for playback of the specific audio file 64 is executed, for example the <PATIO DOOR_JOHN DOE_DETECTED.mp3> audio file 64 in the context of the prior nonlimiting example. More specifically, the user device 16 will recall the specific custom audio file 64 from the app database 65 on the user device 16. The system specific mobile app 76 need not be actively running, or running in the foreground of the user device 16 in order to recall the custom audio file 64 from the database 65, as the command will be executed directly by the operating system ("OS") of the user device 16. In the event that the specific custom audio file 64 cannot be located or otherwise recalled from the app database 65 at step 120, the system 10 will revert to playback of a standard or default PN audio alert.

At the final step 112, the custom audio file 64, for example the <PATIO DOOR_JOHN DOE_DETECTED.mp3> audio file 64 in the context of the prior nonlimiting example, will be played as custom audio alert 68 from a speaker of the user device 16 to indicate receipt of the PN alert signal at the user device 16 and simultaneously identify the genius and or species level classified triggering event and the identification of the corresponding imaging device. For example, in the context of the prior nonlimiting example, the custom audio alert 68 of "JOHN DOE DETECTED AT PATIO DOOR" may be played from the speaker of the user device 16. In combination with the playback of the custom audio alert 68, the PN 62 may also visually appear as a pop-up or scroll-down alert 66 on the touchscreen of the user device 16. The PN 62 visual alert 66 can display text that corresponds to the custom audio alert 68, e.g., "John Doe detected at patio door" or a genic or common message, e.g., "motion detected." The PN 62 can also provide an image 70 from the imaging device 12 corresponding to the triggering event, whether produced by motion or sound, such as an initial image from the transmission or recording of the person 98 in the recording area. Alternatively, after playback of the custom audio alert 68, the PN 62 can also provide a sound clip from the imaging device 12 corresponding to the triggering event, whether produced by motion or sound, such as an initial sound from the transmission or recording of the person 98 in the recording area. By way of example, the PN 62 may provides an image 70 of the person moving in the monitored area. The PN 62 can also indicate a timeframe in which the PN 62 has been delivered, such as "now" or the current actual time when received. The PN 62 can also indicate that the user can tap the pop-up or scroll-down alert 66 on the touchscreen of the user device 16, via the touchscreen I/O to access more details or launch additional functionality of the mobile application 76, such as two-way communication with the person 98.

The one embodiment of the playback of custom audio alert 68 within the system 10 in response to receiving a corresponding PN 62 as described above in reference to FIGS. 4 and 6 specifically related to a single species level classified triggering event, i.e., individual identification 98 via facial recognition. Turning now to FIG. 5, a schematic view of an alternative embodiment of the playback of custom audio 68 within the system 10 is shown in response to a combination of one or more genus level and species level categorized triggering events. Again, following the initialization of the system 10, its imaging device 16, and the configuration of custom audio files 64, the imaging device can begin monitoring areas for triggering events, as in step 96 described above. The imaging devices 12 can monitor for both genus and species level categorized triggering events. Unlike the detection of motion caused by a single person 98, in FIG. 4, the imaging device 12 of FIG. 5 detects motion from multiple objects including, a person 114, a vehicle 116, and the drop-off of a package 118. Detection of these combination of triggering events, activates the capture of image and sound data at the imaging device 12 in the area corresponding to the triggering event at step 100, where the image and sound collected by the imaging device 12 are transmitted as media packets over the WAN 50 to the server 58 from the imaging device 12 and/or base station 14.

The subsequent step 102 of identifying the triggering event may now include identifying multiple triggering event within a single image media packet at the CV 60. By way of nonlimiting example, in FIG. 5, the identification of the vehicle 118 may constitute a genus level categorized triggering event. However, by way of additional processing, user configured image recognition, and/or machine learning, the CV 60 can further identify the vehicle 116 as a particular vehicle, constituting a species level certification triggering event. For example, the CV 60 may identify the particular vehicle by license place recognition, unique vehicle profiles recognition (e.g., fire truck, ambulance, etc.), or by recognition of markings, text or indicia location on the exterior of the vehicle (e.g., postal delivery truck, contractor service vehicle, etc.) While such a degree of species level categorization of triggering events is described in the context of a vehicle 116, it should be understood that such triggering event identification may similarly be available to other categories of genus level detected triggering events, i.e., persons, animals, packages, etc., and are considered well within the scope of the present invention. For example, at step 102, of the system shown in FIG. 5, the CV 60 may also identify the motion of a person 114 as a genus level categorized triggering event, or through additional processing, such as facial recognition, identify the person 114 as a particular individual as a species level categorized triggering event. Similarly, the drop-off of a package 118 may be identified as a species level categorized triggering event, distinct from more general object detection at the genus level.

Generating the PN 62 at step 104 from the above described multiple identified and categorized triggering events may include combining one or more of the multiple classified triggering events into a single PN 62, e.g., the identification of the vehicle as a mail delivery vehicle, the identification of the individual as a mail carrier, identification of the object as a package delivered and the identification of the appropriate imaging device 12. Once combined, a corresponding custom audio file 64 to be played at the user device 16 as a custom audio alert 68 indicating receipt of the PN 62 at the user device 16 is identified. In one embodiment, the audio file 64 may recite each of the identified and categorized triggering events individually. For example, a <DELIVERY VEHICLE_MAIL CARRIER_PACKAGE DELIVERED_FRONT DOOR.mp3> audio file 64 may be played at the user device 16. Alternatively, the audio file 64 played in response to the multiple triggering events may be an abridged or summary of the various combined one or more of the multiple classified triggering events into a single PN 62. For example, a <USPS PACKAGE DELIVERED_FRONT DOOR.mp3> audio file 64 may be played at the user device 16, where the identification of the vehicle as a United States Postal Service mail delivery vehicle, the identification of the individual as a United States Postal Service mail carrier, and the identification of the object as a package are collectively summarized by an abridged portion of the audio file 64.

In another nonlimiting example of the playback of custom audio 68 within the system 10 in response to receiving a corresponding PN 62, the triggering events detected at the imaging device 12 may include the detection of an unknown animal (a genus level categorized triggering event) and a preselected portion of the field of view of the image sensor 12, i.e., an activity zone such as a patio (a species level categorized triggering event). The resultant custom audio file 64 generated and played in response to receiving a corresponding PN 62 at the user device may recite both the genus and species level categorized triggering event. For example, a <UNKNOWN ANIMAL_ON PATIO.mp3> audio file 64 may be played at the user device 16 in response to receiving the corresponding PN 62.

In yet another nonlimiting example of the playback of custom audio 68 within the system 10 in response to receiving a corresponding PN 62, the triggering events detected at the imaging device 12 may include the detection of an known animal, such as a pet dog identified through the CV 60 (a species level categorized triggering event) and a preselected portion of the field of view of the image sensor 12, i.e., an activity zone such as a portion of unfenced yard (a species level categorized triggering event). The resultant custom audio file 64 generated and played in response to receiving a corresponding PN 62 at the user device may recite both the species level categorized triggering events. For example, a <PET DOG_BEYOND FENCED YARD.mp3> audio file 64 may be played at the user device 16 in response to receiving the corresponding PN 62.

In still another nonlimiting example of the playback of custom audio 68 within the system 10 in response to receiving a corresponding PN 62, the triggering events detected at the imaging device 12 may include the detection of an known animal, such as a pet dog identified through the CV 60 (a species level categorized triggering event), or the detection of a known type or class person, such as a dog walker identified through the CV 60 (a species level categorized triggering event), and an identification of the image sensor 12. The resultant custom audio file 64 generated and played in response to receiving a corresponding PN 62 at the user device may recite both the species level categorized triggering events. For example, a <PET DOG_RETURNED FROM WALK_SIDE DOOR.mp3> audio file 64 may be played at the user device 16 in response to receiving the corresponding PN 62.

In yet another nonlimiting example of the playback of custom audio 68 within the system 10 in response to receiving a corresponding PN 62, the triggering events detected at the imaging device 12 may include the detection of an identified vehicle, such as an automobile identified through license plate detection at the CV 60 (a species level categorized triggering event), the detection of a known person, such as a family member identified through facial recognition at the CV 60 (a species level categorized triggering event), and an identification of the image sensor 12. The resultant custom audio file 64 generated and played in response to receiving a corresponding PN 62 at the user device may recite both the species level categorized triggering events. For example, a <JOHN DOE_RETURNED CAR_DRIVEWAY.mp3> audio file 64 may be played at the user device 16 in response to receiving the corresponding PN 62.

In yet another nonlimiting example of the playback of custom audio 68 within the system 10 in response to receiving a corresponding PN 62, the triggering events detected at the imaging device 12 may include the detection of an identified type or class of vehicle, such as an ambulance identified through vehicle shape or side panel indicia identification at the CV 60 (a species level categorized triggering event), and an identification of the image sensor 12. Rather than recite the identified species level categorized triggering event, the resultant custom audio file 64 generated and played in response to receiving a corresponding PN 62 at the user device 16 may include a preselected audio tone such as a siren. For example, a <SIREN.mp3> audio file 64 may be played at the user device 16 in response to receiving the corresponding PN 62 identifying the presence of an emergency vehicle. Alternatively, the audio tone, such as a siren may be combined with identified species level categorized triggering event to form a hybrid audio file 64, containing both an audio tone and a recital of the species level categorized triggering events; for example, a <SIRE_AMBULANCE_DETECTED_FRONT DOOR.mp3> audio file 64 may be played at the user device 16 in response to receiving the corresponding PN 62.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic monitoring system comprising:
   an imaging device configured to detect an at least one triggering event comprising at least one of a motion and a sound and to capture data corresponding to the triggering event; and
   a controller in communication with the imaging device, the controller executing a program stored in a non-transient medium and operable to categorize at least one of the triggering events as a species level triggering event and to send a push notification to a user device upon the imaging device detecting the at least one categorized triggering event,
   wherein the push notification defines an instruction that identifies a plurality of audio files from a database located on the user device, the plurality of audio files including at least one audio file corresponding to at least one user specified aspect of the categorized triggering event and one audio file corresponding to an identification of the imaging device, and
   wherein the push notification further defines an instruction to stitch together the plurality of audios files and initiate playback of the plurality of audio files to generate an audio alert at the user device to provide an audio identification of the categorized triggering event and the imaging device identification upon receipt of the push notification at the user device.

2. The system of claim 1, wherein the species level triggering event is selected from detection of a specified person or a designed class of people, detection of a specified vehicle or vehicle type, detection of a specified animal or animal species, detection of a package, detection of a specified sound, or detection of a specified motion within a specified area within a field of view of the imaging device.

3. The system of claim 2, wherein the program is further operable to categorize another of the at least one of the triggering events as a genus level triggering event selected from detection of an unspecified person, detection of an unspecified vehicle, detection of an unspecified animal, detection of unspecified motion, detection of an unspecified sound, or detection of motion within an unspecified area within the field of view of the imaging device.

4. The system of claim 3, wherein the imaging device is one of a plurality of imaging devices in the system, and wherein the audio alert at the user device is generated from the audio file to provide the audio identification of the species level triggering event, the genus level triggering event, and an identification of imaging device detecting the triggering event.

5. The system of claim 1, wherein the audio file is generated from an input at the user device configured to assign a text identifier to the categorized triggering event.

6. The system of claim 5, further comprising a text to speech module configured to synthesize the audio file from the text identifier.

7. The system of claim 6, further comprising a designated output language at the user device and wherein the text to speech module synthesizes the audio file in the output language from the text identifier provided in an input language.

8. The system of claim 5, further comprising a library of prerecorded sounds configured to generate the audio file corresponding to the text identifier.

9. The system of claim 1, further comprising a microphone at the user device and wherein the system is configured to generate the audio file from a sound recorded at the microphone.

10. An electronic monitoring system comprising:
a plurality of triggering devices, each of which is configured to detect at least a first and a second triggering event, each triggering event comprising at least one of a motion and a sound and to capture data corresponding to the at least first and second triggering events; and
a controller in communication with the imaging devices, the controller executing a program stored in a non-transient medium operable to categorize at least first and second triggering events as at least one genus level triggering event and at least one species level triggering event and to send a push notification to a user device upon the imaging device detecting the categorized first and second triggering event,
wherein the push notification defines an instruction that identifies a plurality of audio files from a database located on the user device, the plurality of audio files including at least one audio file corresponding to at least one user specified aspect of the categorized first and second triggering events and one audio file corresponding to an identification of the imaging device, and
wherein the push notification further defines an instruction to stitch together the plurality of audios files and initiate playback of the plurality of audio files to generate an audio alert at the user device to provide an audio identification of the categorized first and second triggering events, and the imaging device identification upon receipt of the push notification at the user device.

11. The system of claim 10, wherein the species level triggering event is selected from detection of a specified person or class of people, detection of a specified vehicle to type of vehicle, detection of a specified animal or species of an animal, detection of a package, detection of a specified sound, or detection of specified motion within a specified area within a field of view of the imaging device.

12. The system of claim 10, wherein the genus level triggering event is selected from detection of an unspecified person, detection of an unspecified vehicle, detection of an unspecified animal, detection of unspecified motion, detection of an unspecified sound, or detection of motion within an unspecified area within the field of view of the imaging device.

13. The system of claim 10, wherein the system comprises a plurality of discrete user devices, each of which is configured to receive the push notification and generate and an audio alert that is unique to that user device.

14. The system of claim 10, wherein the audio alert generated at the user device from the audio file is a condensed audio alert that corresponds to the identification of the categorized first and second triggering events and the imaging device identification.

15. The system of claim 14, wherein the condensed audio alert is a preselected audio tone.

16. The system of claim 10, wherein the controller is configured to include access to a video stream from the imaging device via the push notification received at the user device.

17. The system of claim 10, wherein the controller communicates with the imaging device via a first network and communicates with the user device via a second network.

18. A method for electronic monitoring comprising:
(a) assigning a text identifier to a species level categorized triggering event comprising at least one of motion and sound;
(b) storing an audio file associated with the categorized triggering event to a database located on a user device;
(c) detecting a triggering event comprising at least one of a motion and a sound;
(d) upon detecting the triggering event, using an imaging device, capturing and recording data;
(e) categorizing the triggering event as the species level categorized triggering event;
(f) sending a push notification to the user device defining an instruction that identifies a plurality of audio files including an at least one audio file from the database located on the user device corresponding to one user specified aspect of the species level categorized triggering event and at least one audio file from the database located on the user device corresponding to an identification of the imaging device, and
(g) stitching together the plurality of audio files to generate an audio alert at the user device from the plurality of audio files to provide an audio identification of the species level categorized triggering event and an imaging device identification upon receipt of the push notification at the user device.

19. The method of claim 18, wherein the species level triggering event includes at least one of detecting a specified person or class of people, detecting a specified vehicle or type of vehicle, detecting a specified animal or species of an animal, detecting a package, detecting a specified sound, and detecting a specified motion.

20. The method of claim 18, further comprising synthesizing an audio signal from a text-to-speech processing of the text identifier and generating the audio file from the synthesized audio signal.

* * * * *